United States Patent Office 2,776,288
Patented Jan. 1, 1957

2,776,288

DIALKYLXANTHINE COMPOUNDS

Theodore I. Fand, White Plains, and Frederick Vidal, Yonkers, N. Y., assignors to Nepera Chemical Co., Inc., Yonkers, N. Y., a corporation of New York No Drawing. Application March 29, 1954,
Serial No. 419,592

12 Claims. (Cl. 260—256)

This invention relates to the preparation of certain condensation products of dialkylxanthines, and relates more particularly to an improved process for the preparation of quaternary ammonium condensation or substitution products of dialkylxanthines.

An object of this invention is the provision of an efficient and economical process for the production of quaternary ammonium condensation or substitution products of certain dialkylxanthines.

Another object of this invention is the preparation of said quaternary ammonium condensation or substitution products by a direct process involving the reaction of a dialkylxanthine, a tertiary amine and an epoxy compound.

Yet another object of this invention is to provide a process for the preparation of said dialkylxanthine condensation or substitution products in a form suitable for pharmaceutical use and free from inorganic salts and other undesirable impurities.

Other objects of this invention will appear from the following detailed description.

The therapeutic value of the condensation products of dialkylxanthines such as theophylline, theobromine and paraxanthine, for example, and the corresponding 8-substituted dialkylxanthines where the 8-substituent is a halogen or nitro group, with quaternary ammonium hydroxide compounds, such as choline, has been established. These compounds find use as mild diuretics and in angina for increasing coronary flow. They are also useful as anti-asthmatics.

It has been found that these novel therapeutic compounds may be obtained by reacting an aqueous solution of a choline salt such as choline chloride with an alkali metal salt of the dialkylxanthine, and separating the condensation product from the aqueous reaction mixture by suitable procedures. The latter involve the removal of the alkali metal salts formed, the evaporation of the aqueous solvent and, finally, the crystallization of the product from the solvent medium. Also, the choline chloride may be converted to the free choline base in solution in an organic solvent by reacting it with an alkali metal hydroxide, removing the alkali metal salt and reacting the free choline base in solution with theophylline or other dialkylxanthine or 8-substituted dialkylxanthine. Similarly, the condensation product of beta-methylcholine with theophylline, or other dialkylxanthine or 8-substituted dialkylxanthine, may be obtained by following a similar procedure using either the salt or free base. Since all of these processes, however, involve the use of choline or beta-methyl choline as the salt or as the free base, these processes require a prior synthesis of these intermediates.

We have now found that the valuable compounds which are obtained by condensing a dialkylxanthine or 8-substituted dialkylxanthine with choline or beta-methyl choline, or like quaternary ammonium hydroxide compound, may be obtained directly without utilizing choline or beta-methyl choline, or a salt of these compounds as an intermediate. In accordance with our novel process, the desired condensation products are obtained by reacting a dialkylxanthine with a mixture of a tertiary alkylamine and an epoxy compound. After reaction is complete, the desired condensation product is readily separated from the reaction mixture. The elimination of several process steps not only makes our process far more economical and convenient than those heretofore employed but also eliminates the possibility of contaminating the product with an inorganic salt which is usually contraindicated in the therapeutic applications of said condensation products.

The novel process of our invention is of general application and provides an efficient and economical method for the production of compounds of the formula:

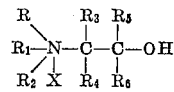

wherein R, $R_1$ and $R_2$ are each lower alkyl groups containing from one to four carbon atoms, which may be the same or different, $R_3$, $R_4$ and $R_5$ are each selected from the group consisting of hydrogen and alkyl groups containing one to three carbon atoms or phenyl, and X is a dialkylxanthine radical wherein the alkyl group contains one to two carbon atoms.

These compounds are formed by the novel process described above. More particularly, our process involves reacting a dialkylxanthine, as described, with a mixture comprising a tertiary amine of the formula

wherein R, $R_1$ and $R_2$ have the significance above, and an epoxy compound of the formula

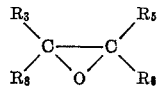

in which the substituents $R_3$, $R_4$, $R_5$ and $R_6$ are the same or different substituents and may be hydrogen, or an alkyl group of from one to three carbon atoms, or a phenyl group, as mentioned above.

The novel condensation reaction of our invention takes place at room temperature and the condensation products are formed quite readily if the reactants are merely placed in a suitable reaction vessel and maintained in said vessel until reaction is complete, e. g. in 24 to 48 hours at room temperature. The reaction preferably is carried out with the aid of an inert organic solvent in which the reactants are soluble. The preferred solvents are the lower aliphatic alcohols such as ethanol, propanol or isopropanol, or higher alcohols such as normal, secondary or tertiary butyl alcohol, dioxane, or the glycols, such as ethylene or propylene glycol. The use of said inert solvents ensures an intimate and homogeneous mixing of the reactants. In order to have the reaction as complete as possible and form the desired dialkylxanthine condensation products in a period of time short enough to be feasible commercially, the reaction is preferably carried out at an elevated temperature, i. e. a temperature of about 60 to 100° C., and with agitation. Under these conditions the reaction will usually be completed in from 1 to 4 hours.

In forming said condensation products by our novel process, the dialkylxanthine is preferably reacted with a slight stoichiometric or molecular excess of both the tertiary alkylamine and the epoxy compound to ensure that the reaction of the dialkylxanthine present is as complete as possible. The molar excess of said reactants which has been found to be satisfactory is from about 5 to about 10% above that required stoichiometrically.

The reaction takes place under the conditions described whether the reaction is carried out in an aqueous or non-aqueous medium. Water may be present, for example, when the tertiary alkylamine is used in the form of its aqueous solution. The amount of water present should be held to a minimum since the major portion is preferably removed from the reaction mixture during reaction and prior to the separation of the condensation product in order to complete the reaction and attain the optimum equilibrium state giving a high yield of the product. Obviously, the less water present the more rapidly will optimum conditions be obtained. Where only small or trace amounts of water are present, the separation of the condensation product is easily accomplished by merely distilling off the organic solvent which, in the case of the alcohols, acts to remove the water as an azeotrope, and then cooling to precipitate the product. If the amount of water and solvent is sufficiently small, merely cooling the reaction mixture is sufficient to cause the product to precipitate. Due to the greatly increased cost of anhydrous reactants or solvents, however, it is uneconomical commercially to carry out the reaction under anhydrous conditions, but it may be.

While trimethylamine has been mentioned as an example of the tertiary alkylamines which may be employed for the production of the condensation products in accordance with our novel process, other tertiary alkylamines such as triethylamine, tripropylamine and tributylamine have also been found to be suitable. We have also found that unsymmetrical or mixed tertiary amines such as methyl-diethylamine, ethyl-dimethylamine, propyl-dimethylamine, butyl-dimethylamine, etc. react in the same manner to yield valuable condensation products of the formula described above. In addition to epoxy compounds such as ethylene oxide and 1,2-propylene oxide, we have found that other epoxy compounds which react to form said condensation products in accordance with said reaction are 1,2-butylene oxide, 2,3-butylene oxide, styrene oxide, etc.

In addition to theophylline, theobromine and paraxanthine, which have been mentioned above as examples of dialkylxanthine compounds which we have found suitable in said process, the corresponding dialkylxanthines wherein the alkyl group is an ethyl radical are also satisfactorily employed, as well as 8-substituted dialkylxanthine compounds such as 8-brom-theophylline, 8-nitrotheophylline and 8-chlor-theophylline. These substituted dialkylxanthines when condensed in accordance with our novel process yield the corresponding quaternary ammonium dialkylxanthine condensation products.

In order to separate the reaction product obtained, the mixture remaining after reaction is complete is first reduced in volume, for example, by distillation under vacuum so as to remove at least the major part of any water present. The product is usually then readily crystallized from the mixture remaining and may be filtered off and further purified, if necessary. The removal of the water present enables the crystalline precipitate to be separated by filtration and in a form requiring little more than the evaporation of the organic solvent therefrom to yield the product in a dry, easily-flowable crystalline form.

In order further to illustrate our invention but without being limited thereto, the following examples are given:

*Example I*

50 parts by weight of an aqueous solution containing 12.5 parts by weight of trimethylamine and 9 parts by weight of ethylene oxide are added to a stainless steel autoclave and 36 parts by weight of anhydrous theophylline introduced, with cooling. The autoclave is sealed and after being maintained at about 20° C. for 48 hours, the temperature is then raised to 100 C. and held at this temperature for one hour. After cooling, the reaction mixture is removed and the volume reduced to about one-half by distillation under vacuum. About 120 parts by weight of isopropanol are added and the unreacted theophylline filtered off. The filtrate is then reduced in volume to about one-third by distillation and an additional 40 parts by weight of isopropanol are added. The solution obtained is cooled and choline theophyllinate crystallizes out. The white crystalline product is filtered off and recrystallized from isopropanol. The product is obtained in a yield of about 83.5% of theory and melts at 188–188.5° C.

*Example II*

80 parts by weight of an aqueous solution of trimethylamine containing 20 parts by weight of trimethylamine are mixed with 15 parts by weight of ethylene oxide with cooling and then about 54 parts by weight of theophylline are added with stirring. After stirring for 48 hours at room temperature, i. e. about 20° C., the mixture becomes viscous. The reaction mixture is then concentrated by distillation under vacuum to remove the water remaining. About 80 parts by weight of isopropanol are added, the mixture is then cooled and a white crystalline precipitate of choline theophyllinate separates. After recrystallization from isopropanol, 35 parts by weight of choline theophyllinate melting at 187.5–188.5° C. is obtained.

*Example III*

14 parts by weight of water and 120 parts by weight of anhydrous isopropanol are placed in a reaction vessel and cooled with a mixture of ice and water. While cooling, 41 parts by weight of anhydrous trimethylamine are bubbled into the alcohol mixture and then 15 parts by weight of ethylene oxide are introduced. To the mixture thus obtained are added about 108 parts by weight of theophylline and the mixture stirred for one hour at 0° C., then for one hour at room temperature and finally for two hours at 60° C. The small amount of water present does not require azeotropic distillation to concentrate the solution. The mixture is then cooled and the choline theophyllinate which separates is filtered of. 123 parts by weight of choline theophyllinate are obtained melting at 187.5–189° C. without any further purification. An additional yield may be obtained by concentration of the filtrate.

*Example IV*

50 parts by weight of an aqueous solution containing 12.5 parts by weight of trimethylamine and 9 parts by weight of ethylene oxide are added to a stainless steel autoclave and 36 parts by weight of anhydrous 8-bromotheophylline introduced, with cooling. The autoclave is sealed and after being maintained at about 20° C. for 48 hours, the temperature is then raised to 100° C. and held at this temperature for one hour. After cooling, the reaction mixture is removed and the volume reduced to about one-half by distillation under vacuum. About 120 parts by weight of isopropanol are added and the unreacted theophylline filtered off. The filtrate is then reduced in volume to about one-third by distillation and an additional 40 parts by weight of isopropanol are added. The solution obtained is cooled and choline 8-bromotheophylline crystallizes out. The white crystalline product is filtered off and recrystallized from isopropanol. The product melts at about 65° C.

*Example V*

80 parts by weight of an aqueous solution of trimethylamine containing 20 parts by weight of trimethylamine are mixed with 15 parts by weight of ethylene oxide with cooling and then about 54 parts by weight of 8-chlorotheophylline are added with stirring. After stirring for 48 hours at room temperature, i. e. about 20° C., the mixture becomes viscous. The reaction mixture is then concentrated by distillation under vacuum to remove the water remaining. About 80 parts by weight of isopropanol are added, the mixture is then cooled and a white crystalline precipitate of choline 8-chlorotheophyllinate separates, which melts at 97–99° C.

*Example VI*

14 parts by weight of water and 120 parts by weight of anhydrous isopropanol are placed in a reaction vessel and cooled with a mixture of ice and water. While cooling, 41 parts by weight of anhydrous trimethylamine are bubbled into the alcohol mixture and then 15 parts by weight of ethylene oxide are introduced. To the mixture thus obtained are added about 108 parts by weight of 8-nitrotheophylline and the mixture stirred for one hour at 0° C., then for one hour at room temperature and finally for two hours at 60° C. The mixture is then cooled and the choline 8-nitrotheophyllinate which separates is filtered off. The product obtained melts at 248° C.

*Example VII*

32 parts by weight of trimethylamine are bubbled into 80 parts by weight of isopropanol, cooled to 0° C., and 25 parts by weight of ethylene oxide then added to the alcoholic solution of trimethylamine. While stirring, 72 parts by weight of theophylline are slowly added and the slurry formed then stirred for one hour at 0° C. and for another hour at about 20° C. The temperature rises spontaneously from the exothermic reaction to 65° C., and after stirring for two hours falls to 60° C. The slurry of choline theophyllinate which has formed is cooled to 0° C., filtered and washed with isopropanol. 106 parts by weight of choline theophyllinate are obtained melting at 186.5–187.5° C., equivalent to a yield of 93.5%.

*Example VIII*

31 parts by weight of trimethylamine are bubbled into 80 parts by weight of isopropanol cooled to 0° C. and 30 parts by weight of 1,2-propylene oxide are added. While stirring, 72 parts by weight of theophylline are added slowly and the slurry which forms is then stirred for one hour at 5° C. and for 1.5 hours at about 20° C. After about 30 minutes the temperature rises to about 60° C. due to the exothermic condensation reaction which takes place. The temperature remains at about 60° C. for the final 1.5 hours of the reaction. The slurry is cooled to about 0° C. and the product formed is filtered off. After recrystallization from isopropanol about 80 parts by weight of beta-methyl-choline theophyllinate is obtained melting at 186.5–187.5° C. A mixed melting point taken with a sample of choline theophyllinate melting at 186.5–187.5° C. and prepared in accordance with Example VII depresses the melting point to 170–172.5° C. Analysis for $C_{13}H_{23}O_3N_5$ is:

|  | Percent N | Percent C | Percent H |
| --- | --- | --- | --- |
| Calculated | 23.6 | 52.5 | 7.79 |
| Found | 24.0 | 52.9 | 7.60 |

*Example IX*

80 parts by weight of isopropanol, dried over calcium oxide, are added to a reaction vessel, cooled to −10° C. and 28 parts by weight of anhydrous trimethylamine are added. While this mixture is held at −10° C. 21 parts by weight of ethylene oxide are added followed by the addition of 65 parts by weight of theophylline. The slurry formed is stirred for one hour at −10° C. and for one hour at about 20° C. While stirring, the temperature rises to about 61° C. and stirring is continued at about 60° C. for an additional one and one-half hours. The slurry obtained is then cooled, filtered and the filter cake washed thoroughly with isopropanol. A yield of 99 parts by weight of choline theophyllinate melting at 185.5–187° C. is obtained. This yield is equivalent to 97% of theory.

It is understood that the foregoing detailed description is given merely by way of illustration and that many variations may be made therein without departing from the spirit of our invention.

Having described our invention, what we desire to secure by Letters Patent is:

What we claim is:

1. Process for the production of chemical compounds, which comprises reacting a dialkylxanthine of the group consisting of dialkylxanthines and 8-substituted dialkylxanthines in which the 8-substituent is selected from the group consisting of nitro, chloro and bromo groups and in which the alkyl groups contain one to two carbon atoms with a tertiary alkyl amine of the formula

wherein R, $R_1$ and $R_2$ are each an alkyl group containing one to four carbon atoms, and an epoxy compound of the formula

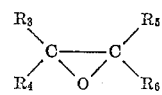

wherein $R_3$, $R_4$, $R_5$ and $R_6$ are the same or different substituents selected from the group consisting of hydrogen and alkyl groups containing one to three carbon atoms and separating a product of the formula

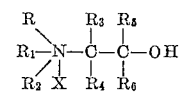

wherein X is a dialkylxanthine radical and the remaining substituents have the significance above.

2. Process for the preparation of choline theophyllinate which comprises reacting theophylline with trimethylamine and ethylene oxide.

3. Process for the preparation of choline theophyllinate which comprises reacting theophylline with an excess of both trimethylamine and ethylene oxide.

4. Process for the preparation of choline theophyllinate which comprises reacting theophylline with an excess of trimethylamine and ethylene oxide in an inert solvent medium.

5. Process for the preparation of beta-methyl choline theophyllinate, which comprises reacting theophylline with trimethylamine and 1,2-propylene oxide.

6. Process for the preparation of beta-methyl choline theophyllinate, which comprises reacting theophylline with an excess of both trimethylamine and 1,2-propylene oxide.

7. Process for the preparation of beta-methyl choline theophyllinate, which comprises reacting theophylline with an excess of both trimethylamine and 1,2-propylene oxide in an inert solvent medium.

8. Process for the preparation of β-ethyl choline theophyllinate, which comprises reacting theophylline with trimethylamine and 1,2-butylene oxide.

9. Process for the preparation of choline 8-brom theophyllinate, which comprises reacting 8-brom theophylline with trimethylamine and ethylene oxide.

10. Process for the preparation of chlorine 8-chlor theophyllinate, which comprises reacting 8-chlor theophylline with trimethylamine and ethylene oxide.

11. Process for the preparation of choline 8-nitro theophyllinate, which comprises reacting 8-nitro theophylline with trimethylamine and ethylene oxide.

12. Process for the preparation of β-ethyl choline theophyllinate, which comprises reacting theophylline with trimethylamine and 1,2-butylene oxide in an inert solvent medium.

References Cited in the file of this patent

UNITED STATES PATENTS 2,661,352   Feinstone _____ Dec. 1, 1953